(12) United States Patent
Alnahhas et al.

(10) Patent No.: US 11,763,472 B1
(45) Date of Patent: Sep. 19, 2023

(54) DEPTH MAPPING WITH MPI MITIGATION USING REFERENCE ILLUMINATION PATTERN

(71) Applicant: Apple Inc., Cupertino, CA (US)

(72) Inventors: Yazan Z. Alnahhas, Mountain View, CA (US); Harish Venkataraman, Half Moon Bay, CA (US)

(73) Assignee: APPLE INC., Cupertino, CA (US)

( * ) Notice: Subject to any disclaimer, the term of this patent is extended or adjusted under 35 U.S.C. 154(b) by 305 days.

(21) Appl. No.: 17/200,832

(22) Filed: Mar. 14, 2021

Related U.S. Application Data

(60) Provisional application No. 63/003,918, filed on Apr. 2, 2020.

(51) Int. Cl.
    *G06T 7/521*      (2017.01)
    *G01S 17/894*      (2020.01)

(52) U.S. Cl.
    CPC ............ *G06T 7/521* (2017.01); *G01S 17/894* (2020.01); *G06T 2207/10028* (2013.01)

(58) Field of Classification Search
    CPC ........... G06T 7/521; G06T 2207/10028; G01S 17/894
    See application file for complete search history.

(56) References Cited

U.S. PATENT DOCUMENTS

| | | |
|---|---|---|
| 4,471,785 A | 9/1984 | Wilson et al. |
| 7,379,163 B2 | 5/2008 | Rafii et al. |
| 7,806,604 B2 * | 10/2010 | Bazakos ............. G06V 40/166 396/427 |
| 8,649,557 B2 | 2/2014 | Hyung et al. |

(Continued)

FOREIGN PATENT DOCUMENTS

| | | |
|---|---|---|
| CN | 108141528 A | 6/2018 |
| EP | 3410486 A1 | 12/2018 |

(Continued)

OTHER PUBLICATIONS

U.S. Appl. No. 17/324,144 Office Action dated Jun. 3, 2022.

(Continued)

*Primary Examiner* — Gregory M Desire
(74) *Attorney, Agent, or Firm* — KLIGLER & ASSOCIATES PATENT ATTORNEYS LTD

(57) ABSTRACT

Apparatus for optical sensing includes an illumination assembly, which directs first optical radiation toward a target scene over a first range of angles and second optical radiation over at least one second range of angles, which is smaller than and contained within the first range, while modulating the optical radiation with a carrier wave having at least one predetermined carrier frequency. A detection assembly includes an array of sensing elements, which output respective signals in response to the first and the second optical radiation. Processing circuitry drives the illumination assembly to direct the first and the second optical radiation toward the target scene in alternation, and processes the signals output by the sensing elements in response to the first optical radiation in order to compute depth coordinates of points in the target scene, while correcting the computed depth coordinates in response to the second optical radiation.

20 Claims, 4 Drawing Sheets

(56) References Cited

U.S. PATENT DOCUMENTS

| | | | |
|---|---|---|---|
| 8,670,021 B2 * | 3/2014 | Kuznetsov | G01S 13/867 348/43 |
| 8,989,455 B2 | 3/2015 | Shor et al. | |
| 9,467,633 B2 | 10/2016 | Johnson et al. | |
| 9,565,373 B2 * | 2/2017 | Strandemar | H04N 5/33 |
| 9,723,233 B2 | 8/2017 | Grauer et al. | |
| 9,898,074 B2 | 2/2018 | Shpunt et al. | |
| 10,061,028 B2 | 8/2018 | Koppal et al. | |
| 10,228,240 B2 | 3/2019 | Trail | |
| 10,229,502 B2 | 3/2019 | Adam et al. | |
| 10,274,377 B1 | 4/2019 | Rabb et al. | |
| 10,430,958 B2 * | 10/2019 | Akkaya | H04N 23/74 |
| 10,469,833 B2 * | 11/2019 | Hua | H04N 13/204 |
| 10,605,916 B2 | 3/2020 | Molnar et al. | |
| 10,616,519 B2 | 4/2020 | Elkhatib et al. | |
| 10,762,655 B1 | 9/2020 | Lindskog et al. | |
| 10,878,589 B2 * | 12/2020 | Bitan | G01S 7/497 |
| 10,929,997 B1 | 2/2021 | Hall et al. | |
| 2005/0145773 A1 | 7/2005 | Hashimoto et al. | |
| 2006/0207978 A1 | 9/2006 | Rizun et al. | |
| 2009/0304294 A1 | 12/2009 | Katsumoto et al. | |
| 2010/0008588 A1 | 1/2010 | Feldkhun et al. | |
| 2010/0128960 A1 | 5/2010 | Yumikake | |
| 2013/0329042 A1 | 12/2013 | Murata et al. | |
| 2014/0064555 A1 | 3/2014 | Sebastian et al. | |
| 2015/0253429 A1 | 9/2015 | Dorrington et al. | |
| 2016/0109575 A1 | 4/2016 | Oggier et al. | |
| 2016/0119606 A1 | 4/2016 | Horikawa | |
| 2016/0198147 A1 | 7/2016 | Waligorski et al. | |
| 2017/0176579 A1 | 6/2017 | Niclass et al. | |
| 2017/0316602 A1 | 11/2017 | Smirnov et al. | |
| 2018/0067197 A1 | 3/2018 | Schockaert et al. | |
| 2018/0095165 A1 | 4/2018 | Cohen et al. | |
| 2018/0275278 A1 | 9/2018 | Yamada | |
| 2018/0278910 A1 * | 9/2018 | Schoenberg | G01S 11/00 |
| 2018/0366504 A1 | 12/2018 | Jin | |
| 2019/0004156 A1 | 1/2019 | Niclass et al. | |
| 2019/0011562 A1 | 1/2019 | Pacala et al. | |
| 2019/0011567 A1 | 1/2019 | Pacala et al. | |
| 2019/0181169 A1 | 6/2019 | Tadmor et al. | |
| 2019/0195991 A1 * | 6/2019 | Miki | G01S 7/4808 |
| 2019/0208118 A1 | 7/2019 | Jasinski | |
| 2019/0219696 A1 | 7/2019 | Xu | |
| 2019/0303551 A1 | 10/2019 | Fussy | |
| 2019/0331776 A1 | 10/2019 | Aotake et al. | |
| 2019/0361532 A1 * | 11/2019 | Sun | G06F 3/017 |
| 2019/0363520 A1 | 11/2019 | Laflaquiere et al. | |
| 2020/0057151 A1 | 2/2020 | Finkelstein et al. | |
| 2020/0195909 A1 * | 6/2020 | Shintani | G01S 7/4865 |
| 2020/0314376 A1 | 10/2020 | Kim et al. | |
| 2021/0048531 A1 | 2/2021 | Medower et al. | |
| 2021/0055419 A1 | 2/2021 | Oggier et al. | |

FOREIGN PATENT DOCUMENTS

| | | |
|---|---|---|
| EP | 3474038 A1 | 4/2019 |
| KR | 20190000052 A | 1/2019 |
| WO | 2018218298 A1 | 12/2018 |

OTHER PUBLICATIONS

U.S. Appl. No. 16/914,513 Office Action dated Jul. 5, 2022.

International Application # PCT/US2021/033049 Search Report dated Sep. 8, 2021.

Naik et al., "A Light Transport Model for Mitigating Multipath Interference in Time-of-Flight Sensors", 2015 IEEE Conference on Computer Vision and Pattern Recognition (CVPR), pp. 1-9, Jun. 7-12, 2015.

Nayar et al., "Fast Separation of Direct and Global Components of a Scene using High Frequency Illumination", ACM Transactions in Graphics, vol. 23, issue 3, pp. 935-944, Jul. 2006.

Payne et al., "Multiple Frequency Range Imaging to Remove Measurement Ambiguity", Proceedings of 9th Conference on Optical 3-D Measurement Techniques, pp. 139-148, Jul. 1-3, 2009.

U.S. Appl. No. 16/914,513 Office Action dated Oct. 21, 2022.

Agranov et al., U.S. Appl. No. 17/324,144, filed Dec. 19, 2021.

U.S. Appl. No. 16/939,019 Office Action dated May 24, 2023.

* cited by examiner

DEPTH MAPPING WITH MPI MITIGATION USING REFERENCE ILLUMINATION PATTERN

CROSS-REFERENCE TO RELATED APPLICATION

This application claims the benefit of U.S. Provisional Patent Application 63/003,918, filed Apr. 2, 2020, which is incorporated herein by reference.

FIELD OF THE INVENTION

The present invention relates generally to depth mapping, and particularly to methods and apparatus for depth mapping using indirect time of flight techniques.

BACKGROUND

Various methods are known in the art for optical depth mapping, i.e., generating a three-dimensional (3D) profile of the surface of an object by processing an optical image of the object. This sort of 3D profile is also referred to as a 3D map, depth map or depth image, and depth mapping is also referred to as 3D mapping. (In the context of the present description and in the claims, the terms "optical radiation" and "light" are used interchangeably to refer to electromagnetic radiation in any of the visible, infrared, and ultraviolet ranges of the spectrum.)

Some depth mapping systems operate by measuring the time of flight (TOF) of radiation to and from points in a target scene. In direct TOF (dTOF) systems, a light transmitter, such as a laser or array of lasers, directs short pulses of light toward the scene. A receiver, such as a sensitive, high-speed photodiode (for example, an avalanche photodiode) or an array of such photodiodes, receives the light returned from the scene. Processing circuitry measures the time delay between the transmitted and received light pulses at each point in the scene, which is indicative of the distance traveled by the light beam, and hence of the depth of the object at the point, and uses the depth data thus extracted in producing a 3D map of the scene.

Indirect TOF (iTOF) systems, on the other hand, operate by modulating the amplitude of an outgoing beam of radiation at a certain carrier frequency, and then measuring the phase shift of that carrier wave in the radiation that is reflected back from the target scene. The phase shift can be measured by imaging the scene onto an optical sensor array, and acquiring demodulation phase bins in synchronization with the modulation of the outgoing beam. The phase shift of the reflected radiation received from each point in the scene is indicative of the distance traveled by the radiation to and from that point, although the measurement may be ambiguous due to range-folding of the phase of the carrier wave over distance.

SUMMARY

Embodiments of the present invention that are described hereinbelow provide improved apparatus and methods for depth measurement and mapping.

There is therefore provided, in accordance with an embodiment of the invention, apparatus for optical sensing, including an illumination assembly, which is configured to direct first optical radiation toward a target scene over a first range of angles and to direct second optical radiation toward a part of the target scene over at least one second range of angles, which is smaller than and contained within the first range, while modulating the first and second optical radiation with a carrier wave having at least one predetermined carrier frequency. A detection assembly includes an array of sensing elements, which are configured to output respective signals in response to the first and the second optical radiation that is incident on the sensing elements during each of a plurality of detection intervals, which are synchronized with the at least one carrier frequency at different, respective temporal phase angles. Objective optics are configured to image the target scene onto the array. Processing circuitry is configured to drive the illumination assembly to direct the first and the second optical radiation toward the target scene in alternation, and to process the signals output by the sensing elements in response to the first optical radiation in order to compute depth coordinates of the points in the target scene, while correcting the computed depth coordinates using the signals output by the sensing elements in response to the second optical radiation.

In some embodiments, the illumination assembly includes an array of emitters, including one or more first emitters configured to emit the first optical radiation and one or more second emitters configured to emit the second optical radiation. In a disclosed embodiment, the illumination assembly includes a semiconductor substrate, and the first and second emitters include semiconductor devices arrayed on the substrate. In one embodiment, the first and second emitters include vertical-cavity surface-emitting lasers (VCSELs).

In a disclosed embodiment, the illumination assembly includes a mask, which is formed over the second emitters and configured to restrict the second optical radiation to the second range of angles.

Additionally or alternatively, the array includes a matrix of the emitters disposed over a central area of the substrate and first and second columns of the second emitters disposed on opposing first and second sides of the central area and configured to direct the second optical radiation toward different, respective second ranges of the angles. In one embodiment, the array further includes at least one row of the second emitters on at least a third side of the central area.

Further additionally or alternatively, the illumination assembly includes a diffuser having a first zone configured to intercept and diffuse the first optical radiation over the first range of angles, and a zone configured to intercept and diffuse the second optical radiation while limiting the diffused second optical radiation to the at least one second range of angles.

In a disclosed embodiment, the at least one second range of angles includes two opposing margins of the first range of angles.

In some embodiments, the processing circuitry is configured to compute first depth coordinates based on the signals output by the sensing elements in response to the first optical radiation and second depth coordinates based on the signals output by the sensing elements in response to the second optical radiation, to detect a discrepancy between the first and second depth coordinates, and to correct the first depth coordinates responsively to the detected discrepancy. In one embodiment, the processing circuitry is configured to identify, responsively to the detected discrepancy, an area of the target scene in which the first depth coordinates are distorted due to multi-path interference, and to adjust the first depth coordinates in the identified area so as to compensate for the multi-path interference.

In a disclosed embodiment, the processing circuitry is configured to output a depth map of the target scene including the corrected depth coordinates.

There is also provided, in accordance with an embodiment of the invention, a method for optical sensing, which includes directing first optical radiation toward a target scene over a first range of angles and directing second optical radiation toward a part of the target scene over at least one second range of angles, which is smaller than and contained within the first range, in alternation with directing the first optical radiation toward the target scene over the first range of angles. The first and second optical radiation is modulated with a carrier wave having at least one predetermined carrier frequency. The target scene is imaged onto an array of sensing elements, which output respective signals in response to the first and the second optical radiation that is incident on the sensing elements during each of a plurality of detection intervals, which are synchronized with the at least one carrier frequency at different, respective temporal phase angles. The signals output by the sensing elements are processed in response to the first optical radiation in order to compute depth coordinates of the points in the target scene, while correcting the computed depth coordinates using the signals output by the sensing elements in response to the second optical radiation.

The present invention will be more fully understood from the following detailed description of the embodiments thereof, taken together with the drawings in which:

DETAILED DESCRIPTION OF EMBODIMENTS

Figure 1:
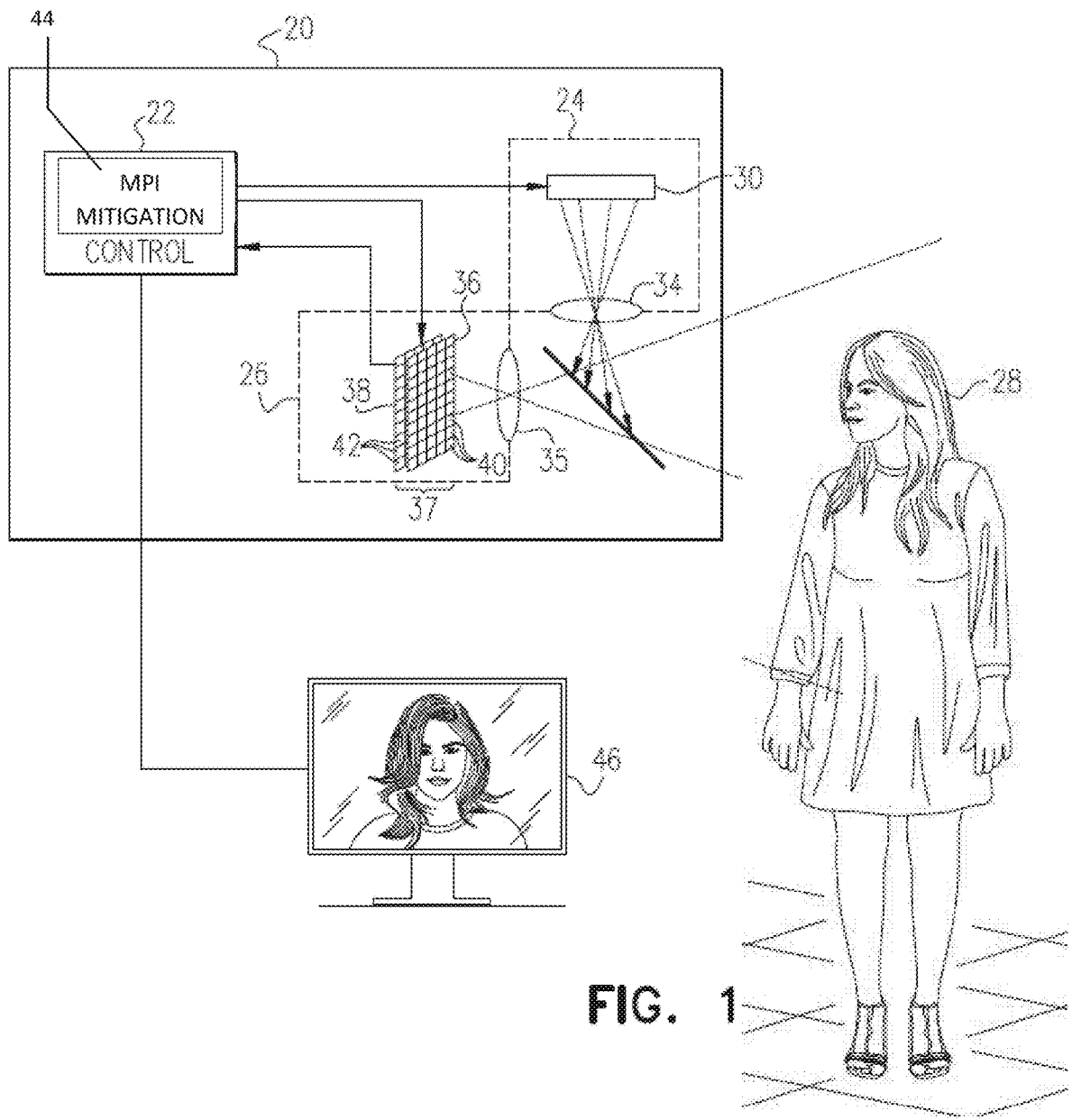
FIG. 1 is a block diagram that schematically illustrates a depth mapping apparatus, in accordance with an embodiment of the invention.

Optical indirect TOF (iTOF) systems that are known in the art use multiple different acquisition phases in the receiver in order to measure the phase shift of the carrier wave in the light that is reflected from each point in the target scene. For this purpose, iTOF systems commonly use special-purpose image sensing arrays, in which each sensing element is designed to demodulate the transmitted modulation signal individually to receive and integrate light during a respective phase of the cycle of the carrier wave. At least three different demodulation phases are needed in order to measure the phase shift of the carrier wave in the received light relative to the transmitted beam. For practical reasons, most systems acquire light during four or possibly six distinct demodulation phases.

In a typical image sensing array of this sort, the sensing elements are arranged in clusters of four sensing elements (also referred to as "pixels"), in which each sensing element accumulates received light over at least one phase of the modulation signal, and commonly over two phases that are 180 degree separated. The phases of the sensing elements are shifted relative to the carrier frequency, for example at 0°, 90°, 180° and 270°. A processing circuit combines the respective signals from the four pixels (referred to as $I_0$, $I_{90}$, $I_{180}$ and $I_{270}$, respectively) to extract a depth value, which is proportional to the function $\tan^{-1}[(I_{270}-I_{90})/(I_0-I_{180})]$. The constant of proportionality and maximal depth range depend on the choice of carrier wave frequency.

Other iTOF systems use smaller clusters of sensing elements, for example pairs of sensing elements that acquire received light in phases 180° apart, or even arrays of sensing elements that all share the same detection interval. In such cases, the synchronization of the detection intervals of the entire array of sensing elements is shifted relative to the carrier wave of the transmitted beam over successive acquisition frames in order to acquire sufficient information to measure the phase shift of the carrier wave in the received light relative to the transmitted beam. The processing circuit then combines the pixel values over two or more successive image frames in order to compute the depth coordinate for each point in the scene.

In addition to light that is directed to and reflected back from points in the target scene, the sensing elements in an iTOF system may receive stray reflections of the transmitted light, such as light that has reflected onto a point in the target scene from another nearby surface. When the light received by a given sensing element in the iTOF sensing array includes stray reflections of this sort, the difference in the optical path length of these reflections relative to direct reflections from the target scene can cause a phase error in the measurement made by that sensing element. This phase error will lead to errors in computing the depth coordinates of points in the scene. The effect of these stray reflections is referred to as "multi-path interference" (MPI). There is a need for means and methods that can recognize and mitigate the effects of MPI in order to minimize artifacts in iTOF-based depth measurement and mapping.

Embodiments of the present invention that are described herein address these problems using a novel illumination scheme to direct modulated optical radiation toward a scene, along with methods of depth processing that take advantage of this illumination scheme. In the disclosed embodiments, an illumination assembly directs wide-field modulated optical radiation toward a target scene over a wide range of angles. In alternation with the wide-field illumination, the illumination assembly directs narrow-field optical radiation toward a part of the target scene over at least one narrower range of angles, which is smaller than and contained within the wide range. Both the wide-field and the narrow-field optical radiation are modulated with carrier waves, either at the same or different carrier frequencies.

The modulated optical radiation that is reflected from the target scene is sensed by a detection assembly, in which objective optics image the target scene onto an array of sensing elements. The sensing elements output respective signals in response to the optical radiation that is incident on the sensing elements during multiple detection intervals. These detection intervals are synchronized with the carrier frequency (or frequencies) at different, respective temporal phase angles, based on the principles of iTOF sensing that are explained above.

Processing circuitry computes depth coordinates of the points in the target scene by processing the signals that are output by the sensing elements in response to the wide-field optical radiation. When the wide-field optical radiation has sufficiently high intensity, these depth coordinates will have low noise and therefore high precision; but they are susceptible to inaccuracies due to MPI, because of reflections that arise from the wide angle of illumination.

To correct these inaccuracies, the processing circuitry uses the signals output by the sensing elements in response to the narrow-field optical radiation. These latter signals may have higher noise and thus lower precision, but they are less susceptible to stray reflections and MPI because the illumination is restricted to narrow angles. In some embodiments, the processing circuitry computes additional depth coordinates within the range or ranges of angles covered by the narrow-field optical radiation, and then corrects the wide-field depth coordinates when there is a discrepancy between the two sets of depth coordinates over some area of the target scene. The processing circuitry may then output a depth map including the corrected depth coordinates. Additionally or alternatively, the corrected depth coordinates are used in other depth sensing and imaging applications, such as 3D face recognition.

In some embodiments, the illumination assembly comprises an array of emitters, for example an array of solid-state emitters on a semiconductor substrate. The array includes a set of one or more emitters that emit the wide-field optical radiation and at least one other set of one or more emitters that emit the narrow-field optical radiation, along with suitable contacts and connections for selectively driving each of the sets. This sort of illumination assembly may thus be based on a single, monolithic emitter chip. The narrow-field emitters may be masked as a part of the fabrication process so as to restrict the optical radiation that they output to a certain narrow range of angles, for example narrow ranges at opposing margins of the wide field. Additionally or alternatively, the illumination assembly may comprise other optical components, such as a structured diffuser, which selectively diffuses the optical radiation over the appropriate angular ranges.

Alternatively, the apparatus may comprise other sorts of illumination assemblies, such as a single emitter or set of emitters, with optics capable of switching between wide-and narrow-field illumination. Similarly, although in the embodiments described below the narrow-field radiation is directed to the margins of the target scene, other angular distributions may alternatively be used, with narrow-field radiation directed toward a single angular range or toward two, three, or more angular ranges, depending on the system design and requirements. All such alternative implementations are considered to be within the scope of the present invention.

FIG. 1 is a block diagram that schematically illustrates a depth mapping apparatus 20, in accordance with an embodiment of the invention. Apparatus 20 comprises an illumination assembly 24 and a detection assembly 26, under control of processing circuitry 22. In the pictured embodiment, the illumination and detection assemblies are boresighted, and thus share the same optical axis outside apparatus 20, without parallax; but alternatively, other optical configurations may be used.

Figure 2A:
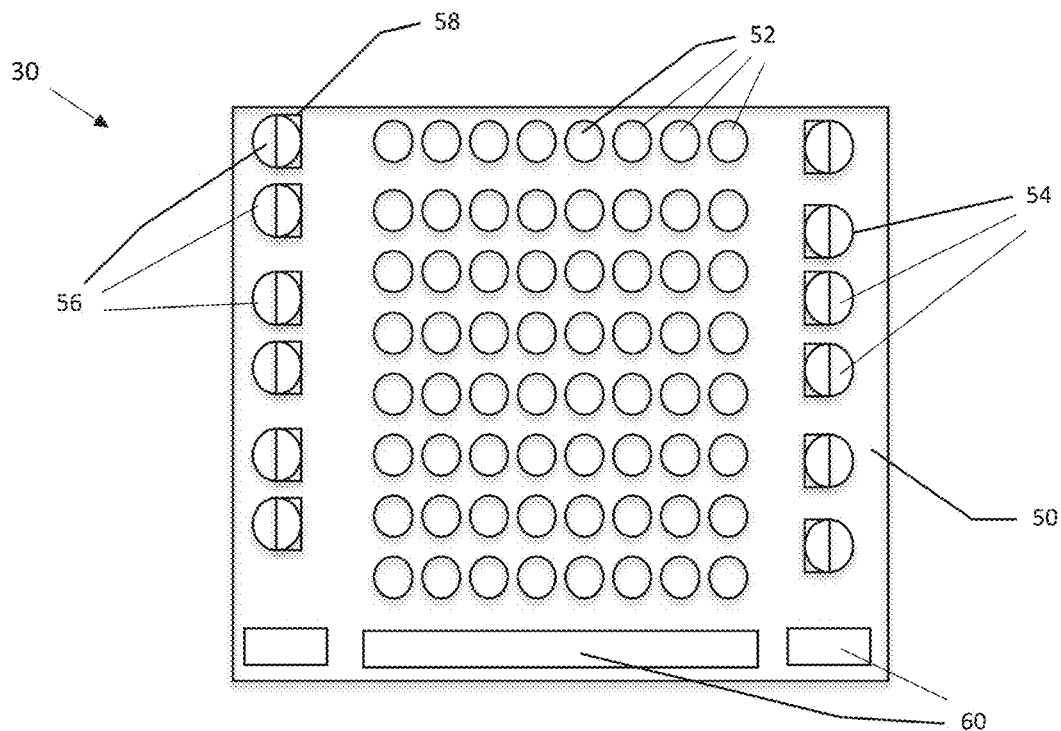
FIGS. 2A and 2B are schematic frontal and sectional views, respectively, of an illumination source used in depth mapping, in accordance with an embodiment of the invention.

Illumination assembly 24 comprises an illumination source 30, for example comprising an array of semiconductor emitters on a semiconductor substrate (as shown in detail in FIG. 2A). The semiconductor emitters typically comprise lasers, such as vertical-cavity surface-emitting lasers (VCSELs), or high-intensity light-emitting diode (LEDs), which emits optical radiation toward a target scene 28 (in this case containing a human subject). Typically, illumination source 30 emits infrared radiation, but alternatively, radiation in other parts of the optical spectrum may be used. The radiation may be directed toward target scene 28 by projection optics 34. The radiation output by source 30 includes both a main, wide-angle illumination beam and directional, narrow-angle beams for use in MPI mitigation, as illustrated in FIGS. 2A/B, for example.

Synchronization circuits in processing circuitry 22 modulate the amplitude of the radiation that is output by source 30 with a carrier wave having a specified carrier frequency. For example, the carrier frequency may be 100 MHz, meaning that the carrier wavelength (when applied to the radiation output by beam source 30) is about 3 m, which also determines the effective range of apparatus 20. (Beyond this effective range, i.e., 1.5 m in the present example, depth measurements may be ambiguous due to range folding.) Alternatively, higher or lower carrier frequencies may be used, depending, inter alia, on considerations of the required range, precision, and signal/noise ratio.

Detection assembly 26 receives the optical radiation that is reflected from target scene 28 via objective optics 35. The objective optics form an image of the target scene on an array 36 of sensing elements 40, such as photodiodes, in a suitable iTOF image sensor 37. Sensing elements 40 are connected to a corresponding array 38 of pixel circuits 42, which gate the detection intervals during which the sensing elements integrate the optical radiation that is focused onto array 36. Typically, although not necessarily, image sensor 37 comprises a single integrated circuit device, in which sensing elements 40 and pixel circuits 42 are integrated. Pixel circuits 42 may comprise, inter alia, sampling circuits, storage elements, readout circuit (such as an in-pixel source follower and reset circuit), analog to digital converters (pixel-wise or column-wise), digital memory and other circuit components. Sensing elements 40 may be connected to pixel circuits 38 by chip stacking, for example, and may comprise either silicon or other materials, such as III-V semiconductor materials.

Processing circuitry 22 controls pixel circuits 42 so that sensing elements 40 output respective signals in response to the optical radiation that is incident on the sensing elements only during certain detection intervals, which are synchronized with the carrier frequency that is applied to beam sources 32. For example, pixel circuits 42 may comprise switches and charge stores that may be controlled individually to select different detection intervals, which are synchronized with the carrier frequency at different, respective temporal phase angles. Alternatively, other types of pixel circuits and detection schemes may be used, as are known in the art of iTOF sensing.

Objective optics 35 form an image of target scene 28 on array 36 such that each point in the target scene is imaged onto a corresponding sensing element 40. To find the depth coordinates of each point, processing circuitry 22 combines the signals output by the sensing element or by a group of sensing elements for different detection intervals. These depth measurements are performed both using the wide-angle main illumination beam and using the narrow directional beams to illuminate the scene. An MPI mitigation module 44 compares the signals received from sensing elements 40 in these different illumination modes in order to detect and correct anomalies that may arise due to MPI. Processing circuitry 22 may then output a depth map 46 made up of these corrected depth coordinates, and possibly a two-dimensional image of the scene, as well.

Processing circuitry 22 typically comprises a general-or special-purpose microprocessor or digital signal processor, which is programmed in software or firmware to carry out the functions that are described herein. Typically, MPI mitigation module 44 is implemented as a part of this software or firmware, based on an algorithm such as that described hereinbelow with reference to FIG. 3. Processing circuitry 22 also includes suitable digital and analog peripheral circuits and interfaces, including synchronization circuits, for outputting control signals to and receiving inputs from the other elements of apparatus 20. The detailed design of such circuits will be apparent to those skilled in the art of depth mapping devices after reading the present description.

Figure 2B:
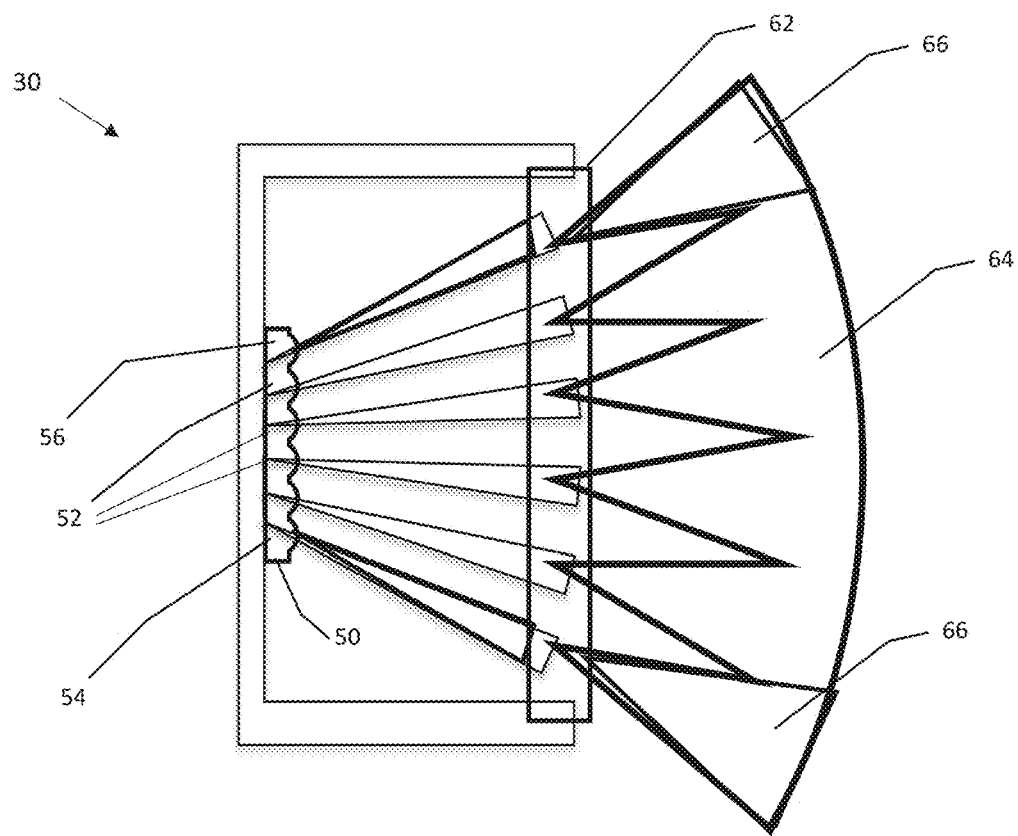

FIGS. 2A and 2B are schematic frontal and sectional views, respectively, of illumination source 30, in accordance with an embodiment of the invention. In this embodiment, illumination source 30 comprises an array of emitters 52, 54, 56, such as VCSELs, which are formed on a semiconductor substrate 50, such as a silicon or III-V semiconductor chip. In one embodiment, the VCSELs are formed on a III-V substrate, such as GaAs or InP, which is bonded to a silicon substrate containing control circuits for the VCSELs, as described, for example, in U.S. Patent Application Publication 2019/0363520, whose disclosure is incorporated herein by reference. Emitters 52, 54 and 56 have separate, respective anode contacts 60 on substrate 50, through which processing circuitry 22 is able to separately actuate the different groups of emitters at different times. The driving signals to emitters 52, 54 and 56 are modulated with a carrier wave of a certain carrier frequency, which may be generated by processing circuitry 22 or by a suitable signal generator on substrate 50 (not shown in the figures).

Emitters 52 are arranged in a matrix extending over a central area of substrate 50 and, when actuated, emit radiation over a wide range 64 of angles extending across the target scene, for example a range of ±30° about the central optical axis (or a larger or smaller range depending on application requirements). The intensity of emission is chosen to enable sensing elements 40 (FIG. 1) to detect the modulated radiation with a signal/noise ratio that is high enough to meet the precision requirements of apparatus 20. For example, the matrix of emitters 52 may be designed so that in the absence of MPI, the depth measurements made by apparatus 20 differ by no more than a few percent among points in the target scene that are located at the same physical distance from the apparatus.

Emitters 54 and 56, which are used for purposes of MPI mitigation, are arranged in columns on opposing sides of the central area of substrate 50. When actuated, emitters 54 and 56 emit optical radiation over respective narrow ranges 66 of angles, which are contained within the edges of wide range 64. For example, ranges 66 may each cover an angular width of 10° at a respective margin of range 64 (although again, larger or smaller numbers and sizes of ranges 66 may be used, either at the margins or in other geometric relations to range 64, for example as described below with reference to FIG. 4). To ensure that the radiation output by emitters 54 and 56 is restricted to the respective ranges 66, a mask 58 can be formed over the emitters, as shown in FIG. 2A. Mask 58 can be formed, for example, by depositing and etching an upper metal layer over the VCSELs so as to cover a part of the VCSEL apertures.

Because the radiation output by emitters 54 and 56 is restricted in this fashion, they will give rise to relatively little MPI. Therefore, depth measurements made within ranges 66 under illumination by emitters 54 and 56 are likely to be accurate, i.e., free of errors induced by MPI, although they may be noisy (and therefore less precise) due to the low intensity of emission by emitters 54 and 56, relative to the matrix of emitters 52. The driving signals applied to emitters 54 and 56 may be modulated at the same carrier frequency as the signals applied to emitters 52, or at a different frequency, for example a higher frequency.

As shown in FIG. 2B, illumination source 30 in the present embodiment comprises a diffuser 62, which homogenizes the radiation output by emitters 52. For precise beam control, diffuser may comprise, for example, a diffractive optical element (DOE) or microlens array. The central zone of diffuser 62 intercepts and diffuses the radiation output by emitters 52 over wide range 64. The peripheral zones of diffuser 62 intercept and diffuse the radiation output by emitters 54 and 56, while limiting the angular extent of this diffused radiation to the respective ranges 66. Diffuser 62 is thus useful in maintaining the narrow angular extent of the radiation output by emitters 54 and 56 and reducing still further the potential effects of MPI in the depth measurements made within ranges 66 under illumination by these emitters.

Figure 3:
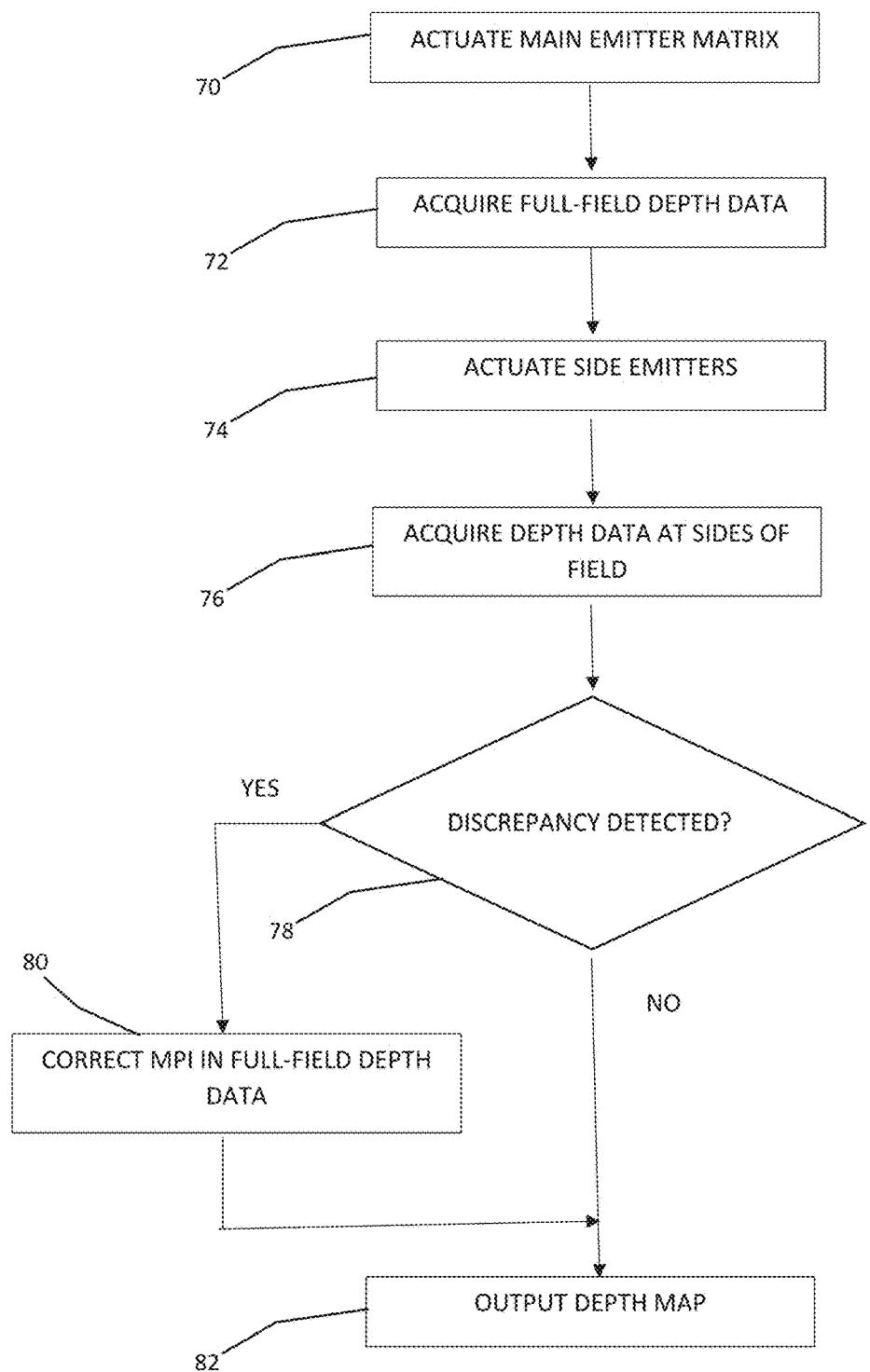
FIG. 3 is a flow chart that schematically illustrates a method for depth mapping, in accordance with an embodiment of the invention.

FIG. 3 is a flow chart that schematically illustrates a method for depth mapping, in accordance with an embodiment of the invention. The method is described hereinbelow, for the sake of concreteness and clarity, with reference to the elements of apparatus 20, as shown in the preceding figures and described above. The principles of this method, however, may alternatively be applied in other systems for depth measurement and mapping with suitable illumination capabilities.

In the method of FIG. 3, processing circuitry 22 actuates emitters 52, 54 and 56 in alternation. In each cycle of alternation, processing circuitry 22 first drives emitters 52 to irradiate range 64 with modulated optical radiation, at a main emission step 70. Sensing elements 40 in array 36 receive and sense the radiation reflected from target scene 28 during different detection intervals, which are synchronized with the modulation carrier frequency at different, respective temporal phase angles, as explained above. Processing circuitry 22 processes the signals output by sensing elements 40 at this step in order to compute depth coordinates of the points in target scene 28 over all of range 64, at a full-field depth acquisition step 72.

Processing circuitry 22 next drives each of the columns of emitters 54 and 56 to irradiate respective ranges 66 with modulated optical radiation, at a side emission step 74. The two columns of emitters 54 and 56 may be driven simultaneously or in succession, one after the other. Processing circuitry 22 processes the signals output by sensing elements 40 at this step in order to compute depth coordinates of the points in target scene 28 within ranges 66, at a side-field depth acquisition step 76.

MPI mitigation module 44 compares the depth coordinates computed at steps 72 and 76, in order to detect discrepancies between the depth coordinates computed at points within ranges 66, at a discrepancy detection step 78. Alternatively, in an equivalent manner, the comparison may be carried out directly on the signals output by sensing elements 40 in these ranges, rather than the derived depth coordinates. When a significant discrepancy is detected, MPI mitigation module 44 applies the depth coordinates found at step 76 in correcting the depth coordinates found at step 72, at an MPI correction step 80. The correction can be applied as necessary not only in ranges 66, but also by extrapolation across the full angular field of range 64. Following this correction, if needed, processing circuitry 22 outputs a depth map of target scene 28 and/or applies further processing to the depth data, such as image analysis and recognition functions, at a depth output step 82.

A discrepancy can be considered significant at step 78, for example, if it extends consistently over an area of multiple sensing elements 40 with magnitude greater than the variance among the neighboring depth coordinates. In this manner, MPI mitigation module 44 may identify, based on the detected discrepancies, an area of target scene 28 in which the depth coordinates found at step 72 are distorted due to MPI, and may then adjust the depth coordinates in the identified area at step 80 so as to compensate for the MPI. For example, MPI mitigation module 44 may find the average difference in this area between the depth coordinates found at step 72 and those found at step 76, and may then apply a constant correction to the depth coordinates found at step 72 in order to compensate for this difference.

MPI mitigation module 44 compares this corrected area in range 66 to neighboring areas within range 64, and may apply a similar adjustment in these neighboring areas, based on the assumption that both the depth coordinates and the MPI should vary smoothly and gradually across target scene 28. Corrections may be derived in this manner in both of ranges 66, at the opposing margins of range 64, and then extrapolated toward the center of the field to give a consistent, accurate depth map. MPI mitigation module 44 may apply additional inputs, such information extracted from a two-dimensional image and/or prior knowledge of the contents of target scene 28, in extrapolating the MPI correction across range 64.

Alternatively, when the discrepancy found at step 78 is too great or too inconsistent to reliably correct, processing circuitry 22 may output an error message, possibly indicating that the user should modify the imaging conditions and then try again.

Figure 4:
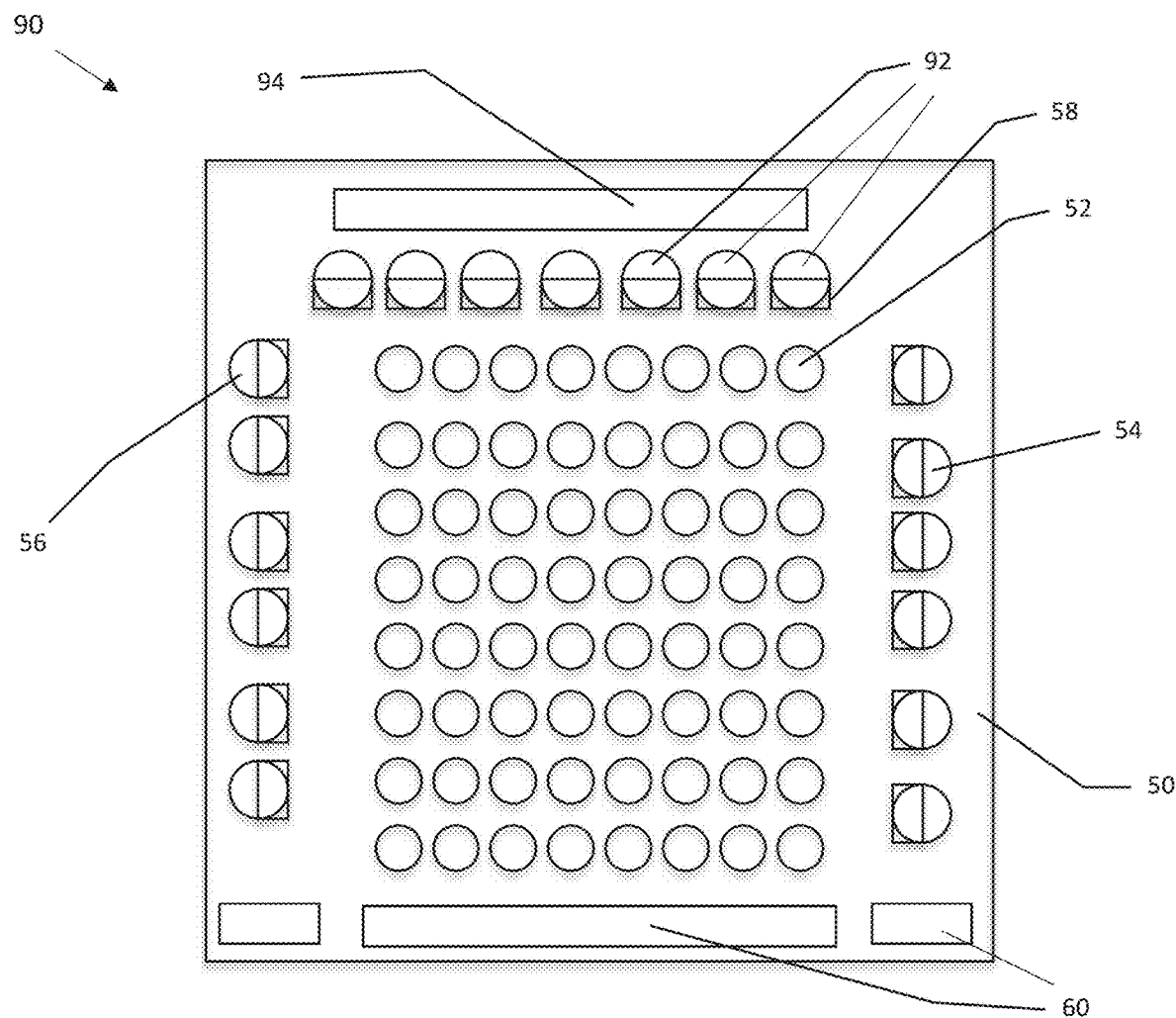
FIG. 4 is a schematic frontal view of an illumination source used in depth mapping, in accordance with another embodiment of the invention.

FIG. 4 is a schematic frontal view of an illumination source 90, in accordance with an alternative embodiment of the invention. In this embodiment, illumination source 90 comprises an array of emitters 52, 54, 56, such as VCSELs, on substrate 50, with the addition of a row of emitters 92 at the upper side of the matrix of emitters 52. Emitters 92 are covered by mask 58 so as to restrict the radiation that they emit to the upper margin of the range of illumination angles. Emitters 92 likewise have a separate anode contact 94 to enable processing circuitry to drive emitters 92 in alternation with the other sets of emitters in illumination source 90.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for optical sensing, comprising:
an illumination assembly, which is configured to direct first optical radiation toward a target scene over a first range of angles and to direct second optical radiation toward a part of the target scene over at least one second range of angles, which is smaller than and contained within the first range, while modulating the first and second optical radiation with a carrier wave having at least one predetermined carrier frequency, wherein the illumination assembly comprises:
an array of emitters, including one or more first emitters configured to emit the first optical radiation and one or more second emitters configured to emit the second optical radiation; and
a diffuser having a first zone configured to intercept and diffuse the first optical radiation over the first range of angles, and a second zone configured to intercept and diffuse the second optical radiation while limiting the diffused second optical radiation to the at least one second range of angles; a detection assembly, comprising:
an array of sensing elements, which are configured to output respective signals in response to the first and the second optical radiation that is incident on the sensing elements during each of a plurality of detection intervals, which are synchronized with the at least one carrier frequency at different, respective temporal phase angles; and
objective optics, which are configured to image the target scene onto the array; and
processing circuitry, which is configured to drive the illumination assembly to direct the first and the second optical radiation toward the target scene in alternation, and to process the signals output by the sensing elements in response to the first optical radiation in order to compute depth coordinates of the points in the target scene, while correcting the computed depth coordinates using the signals output by the sensing elements in response to the second optical radiation.

2. The apparatus according to claim 1, wherein the illumination assembly comprises a semiconductor substrate, and the first and second emitters comprise semiconductor devices arrayed on the substrate.

3. The apparatus according to claim 2, wherein the first and second emitters comprise vertical-cavity surface-emitting lasers (VCSELs).

4. The apparatus according to claim 2, wherein the illumination assembly comprises a mask, which is formed over the second emitters and configured to restrict the second optical radiation to the second range of angles.

5. The apparatus according to claim 1, wherein the at least one second range of angles comprises two opposing margins of the first range of angles.

6. The apparatus according to claim 1, wherein the processing circuitry is configured to compute first depth coordinates based on the signals output by the sensing elements in response to the first optical radiation and second depth coordinates based on the signals output by the sensing elements in response to the second optical radiation, to detect a discrepancy between the first and second depth coordinates, and to correct the first depth coordinates responsively to the detected discrepancy.

7. The apparatus according to claim 6, wherein the processing circuitry is configured to identify, responsively to the detected discrepancy, an area of the target scene in which the first depth coordinates are distorted due to multi-path interference, and to adjust the first depth coordinates in the identified area so as to compensate for the multi-path interference.

8. The apparatus according to claim 1, wherein the processing circuitry is configured to output a depth map of the target scene including the corrected depth coordinates.

9. Apparatus for optical sensing, comprising:
an illumination assembly, which is configured to direct first optical radiation toward a target scene over a first range of angles and to direct second optical radiation toward a part of the target scene over at least one second range of angles, which is smaller than and contained within the first range, while modulating the first and second optical radiation with a carrier wave having at least one predetermined carrier frequency, wherein the illumination assembly comprises:
a semiconductor substrate; and
an array of emitters comprising semiconductor devices arrayed on the substrate, including one or more first emitters configured to emit the first optical radiation and one or more second emitters configured to emit the second optical radiation, wherein the array comprises a matrix of the emitters disposed over a central area of the substrate and first and second columns of the second emitters disposed on opposing first and second sides of the central area and configured to direct the second optical radiation toward different, respective second ranges of the angles; and a detection assembly, comprising:
an array of sensing elements, which are configured to output respective signals in response to the first and the second optical radiation that is incident on the sensing elements during each of a plurality of detection intervals, which are synchronized with the at least one carrier frequency at different, respective temporal phase angles; and objective optics, which are configured to image the target scene onto the array; and processing circuitry, which is configured to drive the illumination assembly to direct the first and the second optical radiation toward the target scene in alternation, and to process the signals output by the sensing elements in response to the first optical radiation in order to compute depth coordinates of the points in the target scene, while correcting the computed depth coordinates using the signals output by the sensing elements in response to the second optical radiation.

10. The apparatus according to claim 9, wherein the array further comprises at least one row of the second emitters on at least a third side of the central area.

11. The apparatus according to claim 9, wherein the illumination assembly comprises a diffuser having a first zone configured to intercept and diffuse the first optical radiation over the first range of angles, and a zone configured to intercept and diffuse the second optical radiation while limiting the diffused second optical radiation to the at least one second range of angles.

12. The apparatus according to claim 9, wherein the illumination assembly comprises a mask, which is formed over the second emitters and configured to restrict the second optical radiation to the second range of angles.

13. The apparatus according to claim 9, wherein the at least one second range of angles comprises two opposing margins of the first range of angles.

14. A method for optical sensing, comprising:
directing first optical radiation toward a target scene over a first range of angles;
directing second optical radiation toward a part of the target scene over at least one second range of angles, which is smaller than and contained within the first range, in alternation with directing the first optical radiation toward the target scene over the first range of angles;
modulating the first and second optical radiation with a carrier wave having at least one predetermined carrier frequency;
imaging the target scene onto an array of sensing elements, which output respective signals in response to the first and the second optical radiation that is incident on the sensing elements during each of a plurality of detection intervals, which are synchronized with the at least one carrier frequency at different, respective temporal phase angles; and
processing the signals output by the sensing elements in response to the first optical radiation in order to compute depth coordinates of the points in the target scene, while correcting the computed depth coordinates using the signals output by the sensing elements in response to the second optical radiation,
wherein processing the signals comprises:
computing first depth coordinates based on the signals output by the sensing elements in response to the first optical radiation;
computing second depth coordinates based on the signals output by the sensing elements in response to the second optical radiation;
detecting a discrepancy between the first and second depth coordinates; and
correcting the first depth coordinates responsively to the detected discrepancy.

15. The method according to claim 14, wherein directing the first optical radiation comprises driving one or more first emitters to emit the first optical radiation, and directing the second optical radiation comprises driving one or more second emitters configured to emit the second optical radiation.

16. The method according to claim 15, wherein the first and second emitters comprise semiconductor devices arrayed on a substrate.

17. The method according to claim 16, wherein directing the second optical radiation comprises forming a mask over the second emitters so as to restrict the second optical radiation to the second range of angles.

18. The method according to claim 14, wherein the at least one second range of angles comprises two opposing margins of the first range of angles.

19. The method according to claim 14, wherein correcting the first depth coordinates comprises identifying, responsively to the detected discrepancy, an area of the target scene in which the first depth coordinates are distorted due to multi-path interference, and adjusting the first depth coordinates in the identified area so as to compensate for the multi-path interference.

20. The method according to claim 14, wherein processing the signals comprises outputting a depth map of the target scene including the corrected depth coordinates.

* * * * *